United States Patent
Shin

(10) Patent No.: US 9,222,240 B2
(45) Date of Patent: Dec. 29, 2015

(54) APPARATUS FOR PROTECTING COMPONENTS OF AN EXCAVATOR

(75) Inventor: Jai-Wook Shin, Gimhae-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 14/347,092

(22) PCT Filed: Sep. 30, 2011

(86) PCT No.: PCT/KR2011/007221
§ 371 (c)(1),
(2), (4) Date: Mar. 25, 2014

(87) PCT Pub. No.: WO2013/047926
PCT Pub. Date: Apr. 4, 2013

(65) Prior Publication Data
US 2014/0232135 A1 Aug. 21, 2014

(51) Int. Cl.
*E02F 9/14* (2006.01)
*E02F 9/24* (2006.01)
(Continued)

(52) U.S. Cl.
CPC ................. *E02F 9/0858* (2013.01); *E02F 3/32* (2013.01); *E02F 9/0891* (2013.01); *E02F 9/2275* (2013.01); *B62D 21/186* (2013.01)

(58) Field of Classification Search
CPC ........... B60R 19/54; B60R 21/11; E02F 3/28; E02F 3/283; E02F 3/30; E02F 3/32; E02F 9/0858; E02F 9/0891; E02F 9/2275; E02F 9/14; E02F 9/163; E02F 9/2271
USPC ............. 296/187.07, 187.13, 190.01, 190.03, 296/191
See application file for complete search history.

(56) References Cited

U.S. PATENT DOCUMENTS

| | | | |
|---|---|---|---|
| 4,095,839 A * | 6/1978 | Lawrence et al. | 296/190.03 |
| 7,427,097 B2 | 9/2008 | Yoon | |
| 2006/0249986 A1 | 11/2006 | Yoon | |

FOREIGN PATENT DOCUMENTS

| | | |
|---|---|---|
| JP | 01-084353 U | 6/1989 |
| JP | 05-089552 U | 12/1993 |

(Continued)

OTHER PUBLICATIONS

International Search Report (in Korean and English) and Written Opinion (in Korean) for PCT/KR2011/007221, mailed Apr. 10, 2012; ISA/KR.

(Continued)

*Primary Examiner* — Jason S Daniels
(74) *Attorney, Agent, or Firm* — Harness, Dickey & Pierce, P.L.C.

(57) ABSTRACT

The present invention relates to a structurally improved apparatus for protecting components of an excavator, which protects components inside an upper swing body comprising a hydraulic valve and a turning joint from damage from residue (R) such as rock fragments or stone fragments falling to the bottom of a boom base during scratch processing in a quarry mine. The apparatus comprises: a boom base supporting the bottom of a boom; a left and right cover support frame formed on a left and right center frame extending from the boom base; and a protective cover body detachably installed on the top of the left and right cover support frame. The protective cover body comprises: an inserting portion coupled to the back of the boom; a dipping plate for absorbing shock when residue falls; and a bottom plate formed on the bottom of the damping plate and contacting and supported on the upper side of the left and right cover support frame.

7 Claims, 2 Drawing Sheets

(51) Int. Cl.
*E02F 9/08* (2006.01)
*E02F 3/32* (2006.01)
*E02F 9/22* (2006.01)
*B62D 21/18* (2006.01)

(56) References Cited

FOREIGN PATENT DOCUMENTS

| | | |
|---|---|---|
| JP | 2000-064350 A | 2/2000 |
| JP | 2003-261963 A | 9/2003 |
| JP | 2005-119545 A | 5/2005 |
| JP | 2006-312441 A | 11/2006 |
| KR | 20-0165813 Y1 | 1/2000 |

OTHER PUBLICATIONS

International Preliminary Report on Patentability (Chapter II) (in Korean) for PCT/KR2011/007221, dated Dec. 17, 2013; IPEA/KR.

* cited by examiner

APPARATUS FOR PROTECTING COMPONENTS OF AN EXCAVATOR

FIELD OF THE INVENTION

The present invention relates to a component protection apparatus for an excavator. More particularly, the present invention relates to a component protection apparatus for an excavator, which is improved structurally to protect internal components including a hydraulic valve and a turning joint of an upper swing structure from foreign substances R including pieces of rocks and stones that fall in the rear of a boom and prevent damage of the internal components during a scratch work of the excavator in a stony mountain.

BACKGROUND OF THE INVENTION

In an excavator as a construction machine, various kinds of components required to operate the machine, for example, components including a turning joint or a swing drive, and a main control valve or a hydraulic valve are equipped inside an upper swing structure between a rear portion of a boom base and an engine room. The scratch work of the excavator requires advanced professional capability to manipulate the work apparatus or the machine since rocks or stones should be crushed, collected or loaded through a boom-bucket manipulation on a construction side including a rocky mountain or a hill.

FIG. 1 is a diagrammatic view schematically showing an example in which a scratch work is performed through a conventional excavator in accordance with the prior art.

In general, an excavator is provided with a lower traveling structure 1 including a track, and an upper swing structure 2 including a bucket 3, an arm 4, a boom 5, an operator's cab 6, a fuel tank 7, a hydraulic tank 8, and a cowl frame 9, which are equipped on the lower traveling structure 1. All the components included in the upper swing structure 2 can typically be equipped on an upper frame.

Distal ends of the boom 5 and the arm 4 supporting the bucket 3 maintain an erected posture at a position higher than that of the operator's cab 6 of the upper swing structure 2, and the bucket 3 crushes or scratches rocks or stones included in a rocky mountain through the operator's manipulation and during a scratch work of the excavator.

In this case, there frequently occurs a phenomenon in which foreign substances R including pieces of rocks and stones fall into the upper swing structure 2 in the rear of the boom 5.

For example, as shown in FIG. 2, a rear portion of a boom base provided at a lower portion of the boom 5 is generally positioned in the proximity of the top center portion of the upper swing structure 2, and a separate protection structure is not designed to be disposed adjacent to the fuel tank 7 or the hydraulic tank 8 and the cowl frame 9. For this reason, the foreign substances directly fall into the upper swing structure 2 in terms of the structure of the boom base.

Therefore, such a conventional excavator entails a problem in that the foreign substances R including pieces of rocks and stones fall in the rear of the boom or the boom base during a scratch work of the excavator, thereby causing a damage to the components including hydraulic valve and the turning joint that are equipped inside the upper swing structure

DETAILED DESCRIPTION OF THE INVENTION

Technical Problems

Accordingly, the present invention has been made to solve the aforementioned problem occurring in the prior art, and it is an object of the present invention to provide a component protection apparatus for an excavator, in which although pieces of rocks and stones fall in the rear of a boom base positioned in the proximity of the top center portion of an upper swing structure, the components mounted in the upper swing structure can be protected and maintained.

Technical Solution

To accomplish the above object, in accordance with an embodiment of the present invention, there is provided a component protection apparatus for an excavator, which protects internal components of an upper swing structure from foreign substances R including pieces of rocks and stones that fall in the rear of a boom during a scratch work of the excavator, the apparatus including:

an upper frame including a boom base that supports a lower portion of the boom, a left center frame that extends from one side of the boom base, and a right center frame extending from the other side of the boom base;

a left cover support frame installed to extend upwardly from the left center frame;

a right cover support frame installed to extend upwardly from the right center frame; and a protective cover body detachably installed on the top surfaces of the left and right cover support frames, wherein the protective cover body includes a fitting part coupled to a rear portion of the boom, a damping plate that absorbs an impact during the falling of the foreign substances, and a bottom plate formed on the underside of the damping plate in such a manner s to be contactingly supported on one sides of the top surfaces of the left and right cover support frames.

Another feature of the present invention resides in that the protective cover body 30 includes an accommodation portion 34 concavely bent toward a central portion of one side thereof.

Still another feature of the present invention resides in that the damping plate 32 and the bottom plate 33 are integrally formed with each other.

Yet another feature of the present invention resides in that the damping plate 32 includes a rubber member that is in direct contact with the foreign substances R to absorb the impact, and the bottom plate 33 is made of a steel material to support a rated load of the foreign substances.

A further feature of the present invention resides in that anti-vibration members 35 and 36 are respectively installed between the underside of the bottom plate 33 and the top surfaces of the left and right cover support frames 23 and 24.

Another further feature of the present invention resides in that each of the left and right cover support frames include a plural coupling holes formed on the top surfaces thereof, and the bottom plate includes a plural through-holes formed on one side thereof, so that the bottom plate is fixedly held on the top surfaces of the left and right cover support frames when fastening members are coupled to the left and right cover support frames while passing through the through-holes and the coupling holes.

Another still further feature of the present invention resides in that the protective cover body further includes a handgrip attached to one side thereof.

Advantageous Effect

The component protection apparatus for an excavator in accordance with an embodiment of the present invention as constructed above has the following advantages.

When foreign substances R fall in the rear of the boom during a scratch work of the excavator, an impact caused by the falling of the foreign substances can be absorbed and buffered by the damping plate 32. In addition, even if vibration of the excavator or movement of the upper swing structure 2 occurs, the foreign substances R can be held in the accommodating part 34 with them collected therein.

Besides, in the case where a rated load is large or an impact caused by the falling of the foreign substances R is large due to an increase in the amount of the foreign substances R collected in the accommodating part 34, the anti-vibration members 35 and 36 interposed between the bottom plate 33 and each of the left and right cover support frames 23 and 24 can secondarily absorb and buffer the rated load and the impact.

Ultimately, the component protection apparatus for an excavator in accordance with the present invention has an advantageous effect in that internal components the upper swing structure can be protected from foreign substances R that fall in the rear of the boom and damage of the internal components can be prevented during a scratch work of the excavator.

BRIEF DESCRIPTION OF THE DRAWINGS

The above objects, other features and advantages of the present invention will become more apparent by describing the preferred embodiments thereof with reference to the accompanying drawings, in which.

PREFERRED EMBODIMENTS OF THE INVENTION

Here, the terms or words used in the specification and the claims of the present invention should not be construed as being typical or dictionary meanings, but should be construed as meanings and concepts conforming to the technical spirit of the present invention on the basis of the principle that an inventor can properly define the concepts of the terms in order to describe his or her invention in the best way.

Hereinafter, a preferred embodiment of the present invention will be described in detail with reference to the accompanying drawings.

Prior to the description of the present invention, corresponding reference numbers are used to denote corresponding elements. That is, 20 denotes an upper frame, 21 denotes an left center frame, 22 denotes a right center frame, 23 denotes a left cover support frame, 24 denotes a right cover support frame, 30 denotes a protective cover body, 32 denotes a damping plate, 33 denotes a bottom plate, and 34 denotes an accommodating part.

Figure 1:
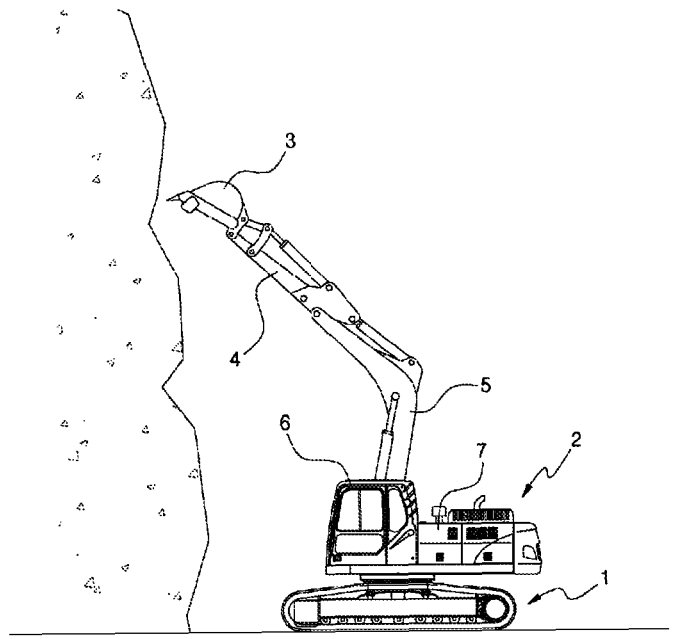
FIG. 1 is a diagrammatic view schematically showing an example in which a scratch work is performed through a conventional excavator in accordance with the prior art.

A component protection apparatus for an excavator according to the present invention is an example of an embodiment that is intended to protect internal components of an upper swing structure 2 from foreign substances R including pieces of rocks and stones that fall in the rear of a boom 5 during a scratch work of the excavator. The component protection apparatus is applied to an excavator as shown in FIGS. 1 and 2.

Figure 2:
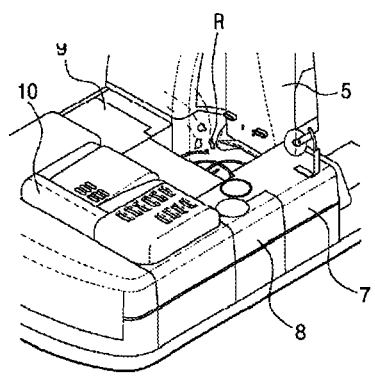
FIG. 2 is a schematic perspective view showing a state in which foreign substances fall in the rear of a boom base adjacent to the top center portion of an upper swing structure during a scratch work of an excavator.

A component protection apparatus for an excavator in accordance with an embodiment of the present invention as shown in FIG. 2 includes: an upper frame 20 including a boom base 5a that supports a lower portion of the boom 5, a left center frame 21 that extends from one side of the boom base 5a, and a right center frame 22 extending from the other side of the boom base 5a; a left cover support frame 23 installed to extend upwardly from the left center frame 21; a right cover support frame 24 installed to extend upwardly from the right center frame 22; and a protective cover body 30 detachably installed on the top portions of the left and right cover support frames 23 and 24.

In addition, the protective cover body 30 includes a fitting part 31 coupled to a rear portion of the boom (5), a damping plate 32 that absorbs an impact during the falling of the foreign substances, and a bottom plate 33 formed on the underside of the damping plate 32 in such a manner s to be contactingly supported on one sides of the top portions of the left and right cover support frames 23 and 24.

The protective cover body 30 includes an accommodation portion 34 concavely bent toward a central portion of one side thereof. In addition, anti-vibration members 35 and 36 are installed between the underside of the bottom plate 33 and the top surfaces of the left and right cover support frames 23 and 24.

Figure 3:
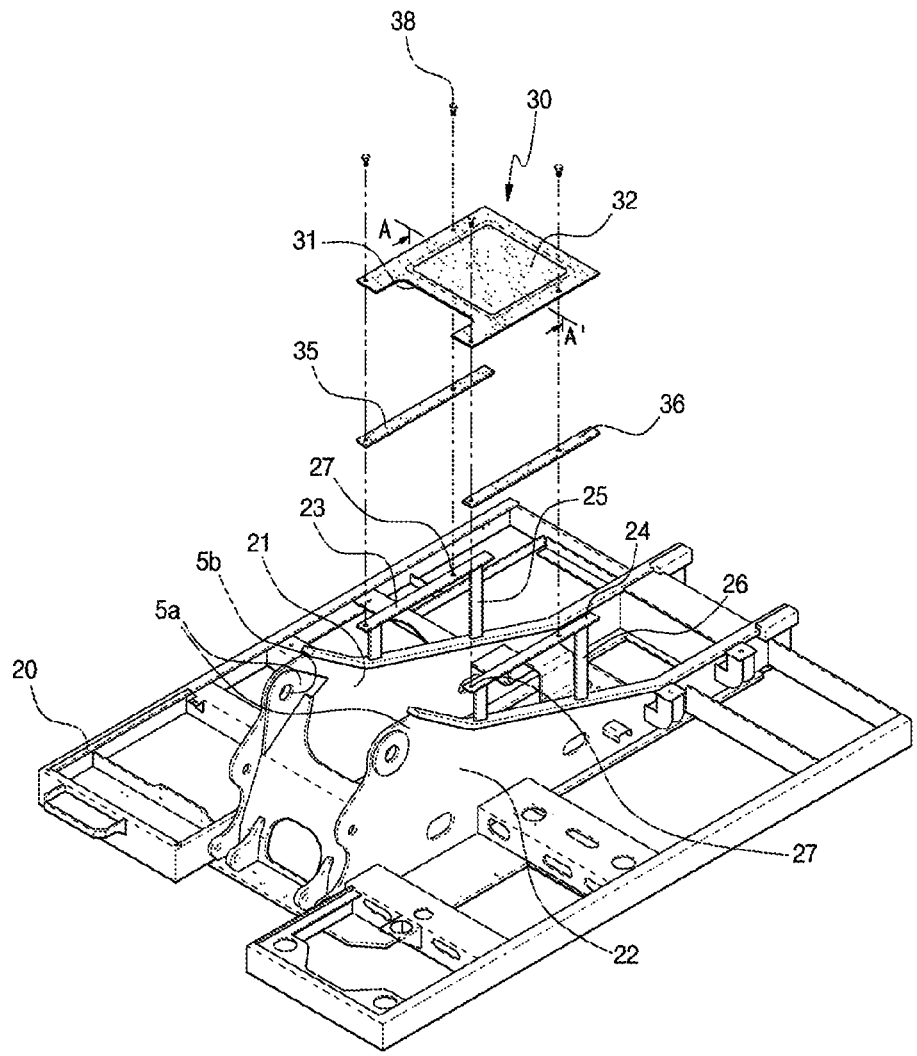
FIG. 3 is an exploded perspective view showing a component protection apparatus for an excavator in accordance with an embodiment of the present invention.
Figure 4:
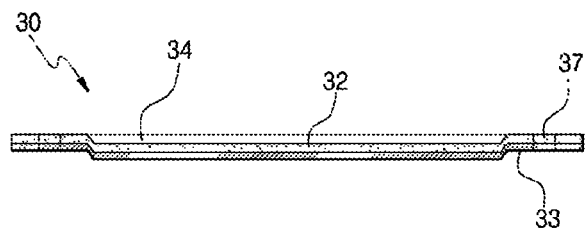
FIG. 4 is a cross-sectional view taken along the line A-A shown in FIG. 3.

Referring to FIGS. 3 and 4, the component protection apparatus for an excavator in accordance with an embodiment of the present invention prevents application of an impact and a damage to the internal components of an upper swing structure 2 due to foreign substances R including pieces of rocks and stones that fall in the rear of a boom 5 during a scratch work of the excavator In the excavator, the left center frame 21 and the right center frame 22 are generally formed at the central portion of the upper frame 20 in the forward and rearward directions of the excavator, and the boom base 5a is typically integrally formed with the left center frame 21 and the right center frame 22.

The boom base 5a may include pin coupling holes 5b so as to be assembled to a lower portion of the boom 5 in a pin-coupling manner.

The left and right cover support frames 23 and 24 for contactingly supporting the lower portion of the protective cover body 30 include a plurality of frame support members 25 and 26 mounted to extend upwardly from the left and right center frames 21 and 22, respectively. The protective cover body 30 may be configured such that it is detachably installed on the top surfaces of the left and right cover support frames 23 and 24 in a bolting or clamping manner.

Moreover, the protective cover body 30 includes a fitting part 31 coupled to a rear portion of the boom 5, a damping plate 32 that absorbs an impact during the falling of the foreign substances R, and a bottom plate 33 formed on the underside of the damping plate 32 in such a manner s to be contactingly supported on one sides of the top surfaces of the left and right cover support frames 23 and 24.

The damping plate 32 can be formed on the entire top surface of the bottom plate 33 as shown in FIGS. 3 and 4, but may be modified such as a damping element that is partially disposed in plural numbers or consists of a number of divided small fragments in consideration of an impact load of the foreign substances R.

In the meantime, the protective cover body 30 includes an accommodation portion 34 concavely bent toward a central portion of one side thereof. The accommodating part 34 may have a geometrical structure with a U-shape in cross section, and performs a function of collecting foreign substances therein.

Preferably, the damping plate 32 and the bottom plate 33 are integrally formed with each other. In the integral formation of the damping plate 32 and the bottom plate 33 with each other, fixing holes may further be provided on the damping plate 32 or the bottom plate 33 so as to securely fix the damping plate 32 or the bottom plate 33.

Anti-vibration members 35 and 36 are respectively installed between the underside of the bottom plate 33 and the top surfaces of the left and right cover support frames 23 and 24. The anti-vibration members 35 and 36 is preferably configured in the form of an elongated spacer made of a rubber material to cover the entire top surfaces of the left and right cover support frames 23 and 24 to absorb vibration caused by an impact, but may be configured in the form of a washer that is fitted around each of the fastening members 38.

Meanwhile, the damping plate 32 includes a rubber member that is in direct contact with the foreign substances R to absorb the impact, and the bottom plate 33 is made of a steel material to support a rated load of the foreign substances R. Further, each of the left and right cover support frames 23 and 24 include a plural coupling holes 27 formed on the top surfaces thereof to securely fix the protection cover body 30, the bottom plate 33 includes a plural through-holes 37 formed on one side thereof, and the bottom plate 33 is fixedly held on the top surfaces of the left and right cover support frames 23 and 24 when fastening members 38 are coupled to the left and right cover support frames 23 and 24 while passing through the through-holes 37 and the coupling holes 27.

In an embodiment of the present invention, although not shown in the drawings, a handgrip may further be attached to one side of the protective cover body 30. The handgrip can be used to remove the foreign substances R collected in the accommodating part 32 and to perform a maintenance and repair work The component protection apparatus for an excavator in accordance with an embodiment of the present invention enables foreign substances R including pieces of rocks and stones falling in the rear of the boom during a scratch work to be blocked by the protective cover body 30. Thus, the foreign substances R is not introduced into the upper swing structure 2, but hit against the outer surface of the protection cover body 30.

In this case, the foreign substances R are primarily brought into close contact with the damping plate 32, which in turn absorbs an impact. In addition, even if vibration of the excavator or movement of the upper swing structure 2 occurs, the foreign substances R are held in the accommodating part 34 with them collected therein.

In the case where a rated load is large or an impact caused by the falling of the foreign substances R is large due to an increase in the amount of the foreign substances R collected in the accommodating part 34, the anti-vibration members 35 and 36 interposed between the bottom plate 33 and each of the left and right cover support frames 23 and 24 secondarily absorb and buffer the rated load and the impact. The anti-vibration members 35 and 36 exhibit a function of absorbing and buffering even the vibration of the excavator transferred through the upper frame 20.

Under the circumstances, if the foreign substances R collected on the protective cover body 30 and in the accommodating part 34 are excessively loaded on the excavator, an operator may perform a necessary operation of removing the foreign substances by releasing the fastened state of the fastening members 38. It should be, of course, noted that when the handgrip is additionally provided to one side of the protective cover body 30, the operator can more easily perform the foreign substance removing operation.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

INDUSTRIAL APPLICABILITY

As described above, the component protection apparatus for an excavator in accordance with an embodiment of the present invention is useful in a construction machine, which requires the internal components of the upper swing structure to be protected from foreign substances including pieces of rocks and stones that fall in the rear of the boom during a scratch work of the excavator.

The invention claimed is:

1. A component protection apparatus for an excavator, which protects internal components of an upper swing structure from foreign substances including pieces of rocks and stones that fall in a rear of a boom during a scratch work of the excavator, the apparatus comprising:
   an upper frame including a boom base that supports a lower portion of the boom, a left center frame that extends from one side of the boom base, and a right center frame extending from an opposite side of the boom base;
   a left cover support frame installed to extend upwardly from the left center frame;
   a right cover support frame installed to extend upwardly from the right center frame; and
   a protective cover body detachably installed on the top surfaces of the left and right cover support frames,
   wherein the protective cover body includes a fitting part adjacent to a rear portion of the boom, a damping plate that absorbs an impact during the falling of the foreign substances, and a bottom plate formed on an underside of the damping plate in such a manner to be contactingly supported on the top surfaces of the left and right cover support frames.

2. The component protection apparatus for an excavator according to claim 1, wherein the protective cover body includes an accommodation portion concavely bent toward a central portion of one side thereof.

3. The component protection apparatus for an excavator according to claim 1, wherein the damping plate and the bottom plate are integrally formed with each other.

4. The component protection apparatus for an excavator according to claim 3, wherein the damping plate includes a rubber member that is in direct contact with the foreign substances to absorb the impact, and the bottom plate is made of a steel material to support a rated load of the foreign substances.

5. The component protection apparatus for an excavator according to claim 4, wherein anti-vibration members are respectively installed between the underside of the bottom plate and the top surfaces of the left and right cover support frames.

6. The component protection apparatus for an excavator according to claim 5, wherein each of the left and right cover support frames include plural coupling holes formed on the top surfaces thereof, the bottom plate includes plural through-holes formed on one side thereof, so that the bottom plate is fixedly held on the top surfaces of the left and right cover support frames when fastening members are coupled to the left and right cover support frames while passing through the through-holes and the coupling holes.

7. The component protection apparatus for an excavator according to claim 2, wherein the protective cover body further includes a handgrip attached to one side thereof.

* * * * *